United States Patent
Terui et al.

(10) Patent No.: US 10,535,073 B2
(45) Date of Patent: *Jan. 14, 2020

(54) SERVER APPARATUS FOR COLLECTING A RESPONSE OF A QUESTIONNAIRE, QUESTIONNAIRE RESPONSE COLLECTION METHOD, QUESTIONNAIRE RESPONSE COLLECTION PROGRAM AND COMPUTER-READABLE RECORDING MEDIUM RECORDED WITH A QUESTIONNAIRE RESPONSE COLLECTION PROGRAM

(75) Inventors: Shingo Terui, Shinagawa-ku (JP); Saki Azuma, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 2054 days.

This patent is subject to a terminal disclaimer.

(21) Appl. No.: 13/823,618

(22) PCT Filed: Sep. 29, 2011

(86) PCT No.: PCT/JP2011/072416
§ 371 (c)(1),
(2), (4) Date: May 9, 2013

(87) PCT Pub. No.: WO2012/043735
PCT Pub. Date: Apr. 5, 2012

(65) Prior Publication Data
US 2019/0197566 A1 Jun. 27, 2019

(30) Foreign Application Priority Data
Sep. 30, 2010 (JP) .................. 2010-220971

(51) Int. Cl.
*H04N 21/475* (2011.01)
*G06Q 30/02* (2012.01)
(Continued)

(52) U.S. Cl.
CPC ..... *G06Q 30/0203* (2013.01); *H04L 63/0876* (2013.01); *H04N 21/4756* (2013.01); *H04W 4/029* (2018.02)

(58) Field of Classification Search
CPC .......... H04N 21/4756; H04N 21/4758; G06Q 30/0203
See application file for complete search history.

(56) References Cited

U.S. PATENT DOCUMENTS

| 2004/0013398 | A1 | 1/2004 | Miura et al. |
| 2006/0206379 | A1* | 9/2006 | Rosenberg ............. G06Q 30/02 705/14.54 |

(Continued)

FOREIGN PATENT DOCUMENTS

| JP | 2004-054954 A | 2/2004 |
| JP | 2004-213570 A | 7/2004 |

(Continued)

*Primary Examiner* — Pinkal R Chokshi
(74) *Attorney, Agent, or Firm* — Sughrue Mion, PLLC

(57) ABSTRACT

A server apparatus for accurately collecting responses of questionnaires with regard to a target object including a plurality of scenes is provided. An operation signal for obtaining a time when response operation is performed is received from a terminal device. A time and each scene of the target object is associated in scene information, and a scene of the target object is identified as being a target of the response of the questionnaire, based on the scene information and the obtained time.

11 Claims, 8 Drawing Sheets

(51) Int. Cl.
*H04W 4/029* (2018.01)
*H04L 29/06* (2006.01)

(56) References Cited

U.S. PATENT DOCUMENTS

| | | | | |
|---|---|---|---|---|
| 2006/0248560 A1* | 11/2006 | Wada | ............ | G11B 27/034 |
| | | | | 725/89 |
| 2011/0313849 A1* | 12/2011 | Brueck | ............ | G06Q 30/0201 |
| | | | | 705/14.45 |
| 2013/0097190 A1* | 4/2013 | Shah | ............ | H04N 21/812 |
| | | | | 707/754 |
| 2014/0115621 A1* | 4/2014 | Karam | ............ | H04N 21/252 |
| | | | | 725/24 |

FOREIGN PATENT DOCUMENTS

| | | |
|---|---|---|
| JP | 2005-293160 A | 10/2005 |
| JP | 2008-136210 A | 6/2008 |
| JP | 2009-211685 A | 9/2009 |
| JP | 2010-015325 A | 1/2010 |
| JP | 2010-0520554 A | 6/2010 |
| WO | 2008/108806 A1 | 9/2008 |

\* cited by examiner

FIG. 3

| MEMBER DB 121 |
|---|
| MEMBER ID |
| PASSWORD |
| SEX |
| AGE |
| MAIL ADDRESS |

FIG. 4

| MOVIE SCHEDULE DB 122 |
|---|
| MOVIE ID |
| LOCATION OF SCREENING OF MOVIE |
| MOVIE SCREENING START TIME |
| MOVIE SCREENING END TIME |

FIG. 5

| QUESTIONNAIRE RESULT DB 123 |
|---|
| MEMBER ID |
| MOVIE ID |
| SCENE ID OF SCENE WHICH IS TARGET OF RESPONSE OF THE QUESTIONNAIRE |
| CONTENTS OF RESPONSE |

FIG. 6

| SCENE DB 124 |
|---|
| MOVIE ID |
| SCENE ID |
| SCENE START TIME |
| SCENE END TIME |

FIG. 7

```
          SCENE  SCENE  SCENE           SCENE   SCENE   SCENE
            1      2      3             (n-3)   (n-2)   (n-1)    n
MOVIE                                                                    MOVIE
SCREENING                                                                SCREENING
START TIME                                                               END TIME
         0:00:00 0:03:15 0:07:37 0:11:01  1:34:44 1:37:18 1:39:25 1:42:58 1:47:27
```

FIG. 8

| MOVIE ID | MI3 | MI3 | MI3 | | MI3 | MI3 | MI3 |
|---|---|---|---|---|---|---|---|
| SCENE ID | 1 | 2 | 3 | : | (n-3) | (n-2) | (n-1) | n |
| SCENE START TIME | 0:00:00 | 0:03:16 | 0:07:38 | | 1:34:44 | 1:37:19 | 1:39:26 | 1:42:58 |
| SCENE END TIME | 0:03:15 | 0:07:37 | 0:11:01 | | 1:37:18 | 1:39:25 | 1:42:58 | 1:47:27 |

FIG. 11

|  |  | Acceleration a (m/s²) | | | |
| --- | --- | --- | --- | --- | --- |
|  |  | 0<a≦0.3 | 0.3<a≦0.6 | 0.6<a≦0.9 | 0.9<a |
| number of times of shaking | 1~2 | 1 | 2 | 3 | 4 |
|  | 3~5 | 2 | 3 | 4 | 5 |
|  | 5~7 | 3 | 4 | 5 | 5 |
|  | 8~ | 4 | 5 | 5 | 5 |

FIG. 12

| IMPRESSION | IMPRESSION LEVEL | SCENE ID | | |
|---|---|---|---|---|
| | | 1 | 2 | ... |
| INTERESTING | 5 | 50people | 5people | ... |
| | 4 | 45people | 11people | ... |
| | 3 | 30people | 8people | ... |
| | 2 | 21people | 10people | ... |
| | 1 | 15people | 9people | ... |
| NOT INTERESTING | 1 | 9people | 10people | ... |
| | 2 | 8people | 5people | ... |
| | 3 | 5people | 30people | ... |
| | 4 | 6people | 45people | ... |
| | 5 | 3people | 60people | ... |

"INTERESTING" ←——————→ "NOT INTERESTING"

SERVER APPARATUS FOR COLLECTING A RESPONSE OF A QUESTIONNAIRE, QUESTIONNAIRE RESPONSE COLLECTION METHOD, QUESTIONNAIRE RESPONSE COLLECTION PROGRAM AND COMPUTER-READABLE RECORDING MEDIUM RECORDED WITH A QUESTIONNAIRE RESPONSE COLLECTION PROGRAM

CROSS REFERENCE TO RELATED APPLICATIONS

This application is a National Stage of International Application No. PCT/JP2011/072416 filed Sep. 29, 2011, claiming priority based on Japanese Patent Application No. 2010-220971 filed Sep. 30, 2010, the contents of all of which are incorporated herein by reference in their entirety.

TECHNICAL FIELD

The present invention relates to a technical field of an apparatus and the like for collecting responses of questionnaires from respondents who submit responses to the questionnaires with regard to a target object including a plurality of scenes and in which the scene changes over an elapsed time.

BACKGROUND ART

In the past, for example, at a preview of movie and the like, survey is conducted by questionnaire about the movie on the screen. More specifically, a method is used to distribute a questionnaire to each viewer, and to have the viewer to fill in the questionnaire after watching the movie. In this case, however, the viewer does not remember all the scenes of the movie that the viewer saw, and therefore, impressive scenes are reflected in questionnaire results, but in many cases, other scenes (e.g., a scene that is vaguely remembered asagood scene) may not be reflected in questionnaire results.

On the other hand, a technique for measuring a scene which the viewer is interested in media by measuring viewer's physiological reaction to each of main events of the media (television game and the like) and measuring timing of each of main events is disclosed (for example, see patent document 1).

CITATION LIST

Patent Literature

PTL 1: Japanese Unexamined Patent Application Publication (Translation of PCT Application) No. 2010-520554

SUMMARY OF THE INVENTION

Problem to be Solved by the Invention

However, in the technique disclosed in patent document 1, it is difficult for a person conducting survey by questionnaire to obtain a result in accordance with the contents that are to be surveyed. On the other hand, in the survey by questionnaire, various kinds of surveys about the scenes are often conducted, e.g., collecting information about both of the scenes, i.e., scenes in which the viewer is interested and scenes in which the viewer is not interested.

The present invention is made in view of the above problem, and it is an object of the present invention to provide a server apparatus and the like for accurately collecting responses of questionnaires in accordance with the contents which a person who conducts survey by questionnaire wants to survey, from viewers who views and/or listens video, music, plays, and the like.

Means for Solving the Problem

In order to solve the above problem, an aspect of an example embodiment provides a server apparatus for collecting a response of a questionnaire from a terminal device of a respondent who submits the response to the questionnaire with regard to a target object while the respondent views the target object including multiple scenes and in which the scene changes over an elapsed time, and the server apparatus includes storage a means that stores sound data of the target object, a receiving means that receives ambient sound data of the terminal device collected when the response operation is performed, from the terminal device with which the respondent performs response operation to submit the response to the questionnaire while the respondent is viewing the target object, and an identifying means that compares the sound data of the target object stored by the storage means and the received sound data, and identifies a scene as a target of the response of the questionnaire, on the basis of the comparison result.

Therefore, when the respondent submits the response to the questionnaire with regard to the scene constituting the target object which the respondent is viewing, the respondent may perform the response operation for the terminal operation during the scene, and it is easy to submit the response. The server apparatus can identify the scene for which the respondent submits a response to the questionnaire, from the sound data collected when the response operation is performed. Therefore, the response of questionnaire with regard to the scene can be accurately collected without mixing with responses with regard to other scenes.

An aspect of an example embodiment provides the server apparatus, wherein the receiving means further receives response information for identifying a content of the response of the questionnaire, and the server apparatus further comprising a response storage means that stores the content of response of the questionnaire identified based on the response information received by the receiving means, in association with a scene identified by the identifying means.

An aspect of an example embodiment provides the server apparatus, wherein a plurality of response operations are defined in accordance with each of the plurality of different contents of responses of questionnaires, and the response information is information for identifying the content of response of the questionnaire in accordance with the response operation.

Therefore, multiple types of contents of responses for the scenes can be obtained. Accordingly, the contents of the survey by the questionnaires can be enriched.

An aspect of an example embodiment provides the server apparatus further comprising a type information transmission means that transmits type information indicating a type of each target object to the terminal device when there are a plurality of target objects, wherein the storage means stores the sound data for each type of the target object, the receiving means further receives, from the terminal device, selected type information indicating the type of the target object selected by the respondent based on the transmitted type information, and the identifying means compares the sound data corresponding to the type indicated by the received selected type information and the received sound data, and identifies the scene on the basis of the comparison result.

Therefore, even when there are multiple target objects which are to be evaluated by the respondent, the respondent can appropriately understand the target object for which the respondent submits a response of questionnaire.

An aspect of an example embodiment provides the server apparatus, wherein the storage means further stores evaluation position information indicating a position where the target object is to be viewed for each of the target objects, in association with the target object, the receiving means further receives response target object information indicating the target object for which the response of the questionnaire is submitted and terminal position information indicating a position of the terminal device from the terminal device, and the server apparatus further comprises a position anti-fraud determination means that determines that the response of the questionnaire based on the sound data transmitted from the terminal device is invalid, when the evaluation position information stored in the storage means in association with the target object for which the response of the questionnaire is submitted which is indicated by the received response target object information is different from the received terminal position information.

Therefore, when the respondent submits a response to a questionnaire at a position different from the position where the respondent should see the target object even though the respondent actually does not see the target object, then such case can be determined as invalid.

An invention according to an aspect of an example embodiment provides the server apparatus further comprising a transmission means that transmits information indicating the scene of the target object identified by the identifying means to the terminal device, wherein the receiving means receives, from the terminal device, confirmation information made by the respondent indicating whether the identified scene is the scene as a target of the response of the questionnaire, and the identifying means cancels a fact of having identified the scene of the target object, when the received confirmation information indicates that the scene is not the scene which is the target of the response of the questionnaire.

Therefore, the respondent can check whether the scene of the target object for which the respondent actually submits a response to the questionnaire is the same as the scene of the target object identified by the server, and the accuracy in identifying the scene of the target object can be improved.

An aspect of an example embodiment provides the server apparatus, wherein the response operation by the respondent is operation shaking the terminal device, the receiving means further receives operation value information for identifying an operation value of at least one of the number of times the terminal device is shaken or acceleration of the terminal device when the shaking operation is done, the server apparatus further comprises a level identifying means that identifies a level of the content of the response of the questionnaire from the operation value identified based on the received operation value information, and the response storage means further stores the level identified by the level identifying means, in association with the scene identified by the identifying means.

Therefore, the level of the content of response of questionnaire can be identified from the operation value of at least one of the number times the respondent shakes the terminal device or the acceleration when the respondent shakes the terminal device.

An aspect of an example embodiment provides the server apparatus, wherein the response operation by the respondent is operation shaking the terminal device, the receiving means further receives operation value information for identifying an operation value of at least one of the number of times the terminal device is shaken or acceleration of the terminal device when the shaking operation is done, and the server apparatus further comprises: a level identifying means that identifies a level of evaluation for the respondent with regard to the scene when the response operation is performed, from the operation value identified based on the received operation value information; and a level storage means that stores the level of the evaluation identified by the level identifying means, in association with the scene identified by the identifying means.

Therefore, the level of the respondent's evaluation for the scene can be identified from the operation value of at least one of the number times the respondent shakes the terminal device or the acceleration when the respondent shakes the terminal device.

An aspect of an example embodiment provides the server apparatus further comprising: an operation value storage means that stores the operation value information received by the receiving means; an average calculation means that looks up the operation value information stored in the operation value storage means, calculates an average of the operation values of the entire respondents that perform operation to submit the responses of the questionnaires, and calculates an average of the operation values of any one of the respondents that perform operation to submit the response of the questionnaire; and a correction means that corrects the operation value identified by the operation value information transmitted from the terminal device of the one of the respondents, on the basis of a ratio of the average of the operation values calculated for the entire respondents by the average calculation means and the average of the operation values calculated for the one of the respondents, wherein the level identifying means identifies the level from the operation value corrected by the correction means.

Therefore, the operation value of at least one of the number times the respondent shakes the terminal device or the acceleration when the respondent shakes the terminal device can be corrected, so that the individual difference in the respondent's shaking operation can be reduced.

An aspect of an example embodiment provides a questionnaire response collection method executed by a computer included in a server apparatus collecting a response of a questionnaire from a terminal device of a respondent who submits the response to the questionnaire with regard to a target object while the respondent views the target object including multiple scenes and in which the scene changes over an elapsed time, the questionnaire response collection method comprising: a receiving step of receiving ambient sound data of the terminal device collected when the response operation is performed, from the terminal device with which the respondent performs response operation to submit the response to the questionnaire while the respondent is viewing the target object; and an identifying step of comparing the sound data of the target object stored by a storage means of the server apparatus and the received sound data, and identifying a scene which is the target of the response of the questionnaire, on the basis of the comparison result.

An aspect of an example embodiment provides a computer-readable recording medium recorded with a questionnaire response collection program for causing a computer included in a server apparatus collecting a response of a questionnaire from a terminal device of a respondent who submits the response to the questionnaire with regard to a target object while the respondent views the target object including multiple scenes and in which the scene changes over an elapsed time, the questionnaire response collection program causing the computer to function as: a receiving means that receives ambient sound data of the terminal device collected when the response operation is performed, from the terminal device with which the respondent performs response operation to submit the response to the questionnaire while the respondent is viewing the target object; and an identifying means that compares the sound data of the target object stored by a storage means of the server apparatus and the received sound data, and identifies a scene which is the target of the response of the questionnaire, on the basis of the comparison result.

An aspect of an example embodiment provides a questionnaire response collection program for causing a computer included in a server apparatus collecting a response of a questionnaire from a terminal device of a respondent who submits the response to the questionnaire with regard to a target object while the respondent views the target object including multiple scenes and in which the scene changes over an elapsed time, the questionnaire response collection program causing the computer to function as: a receiving means that receives ambient sound data of the terminal device collected when the response operation is performed, from the terminal device with which the respondent performs response operation to submit the response to the questionnaire while the respondent is viewing the target object; and an identifying means that compares the sound data of the target object stored by a storage means of the server apparatus and the received sound data, and identifies a scene which is the target of the response of the questionnaire, on the basis of the comparison result.

Effect of the Invention

According to the present invention, when the respondent submits the response to the questionnaire with regard to the scene constituting the target object which the respondent is viewing, the respondent may perform the response operation for the terminal operation during the scene, and it is easy to submit the response. The server apparatus can identify the scene for which the respondent submits a response to the questionnaire, from the sound data collected when the response operation is performed. Therefore, the response of questionnaire with regard to the scene can be accurately collected without mixing with responses with regard to other scenes.

BRIEF DESCRIPTION OF THE DRAWINGS

FIG. 3 is a figure for illustrating an example of the contents registered to a member DB 121.

FIG. 4 is a figure for illustrating an example of the contents registered to a movie schedule DB 122.

FIG. 5 is a figure illustrating an example of the contents registered to a questionnaire result DB 123.

FIG. 6 is a figure illustrating an example of the contents registered to a scene DB 124.

FIG. 7 is a figure of an example illustrating how a movie is divided into multiple scenes.

FIG. 8 is a figure illustrating an example of data registered to the scene DB 124.

FIG. 11 is a figure illustrating an example of impression level obtaining table.

FIG. 12 is a figure illustrating an example of questionnaire result of summation of the number of people for each of the scenes, each of impression contents, and each of impression levels.

MODES FOR CARRYING OUT THE INVENTION

Hereinafter, an embodiment of the present invention will be explained with reference to drawings. The embodiment explained below is an embodiment when the present invention is applied to a server 1 of a questionnaire system S.

[1. Configuration of Questionnaire System S]

First, the configuration of the questionnaire system S according to the present embodiment of the present invention will be explained with reference to FIG. 1.

Figure 1:
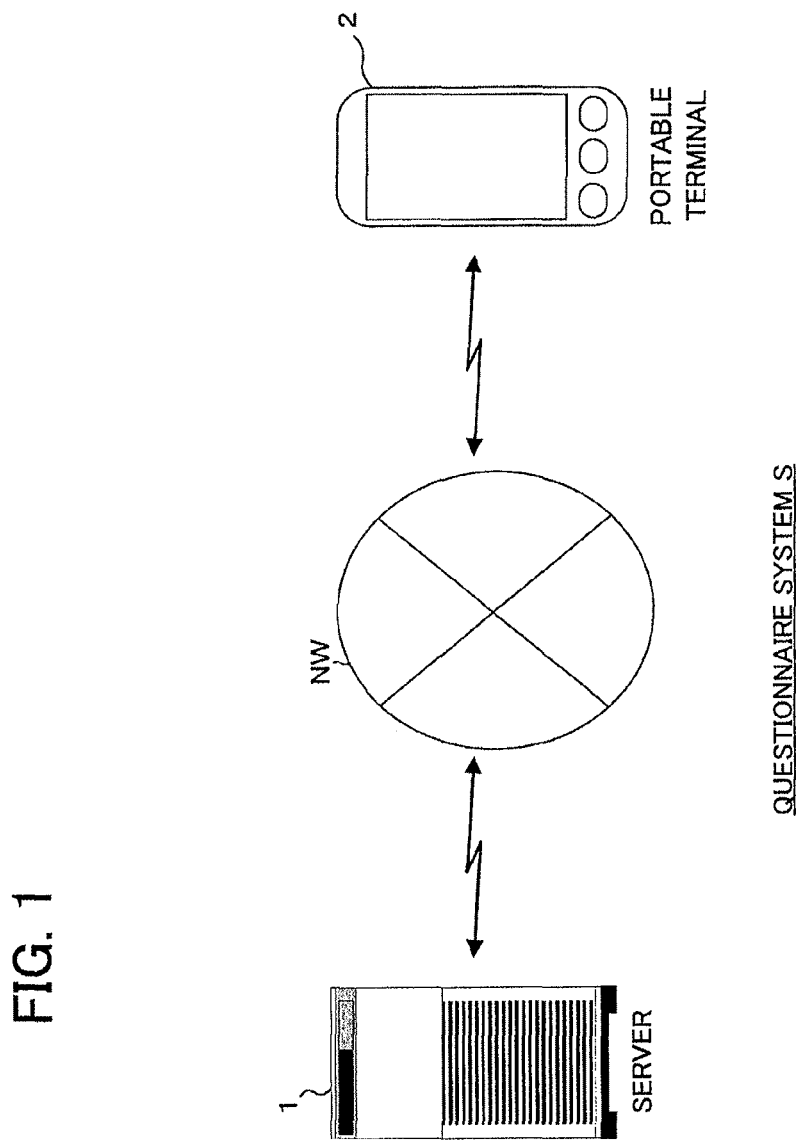
FIG. 1 is a figure for illustrating an example of schematic configuration of a questionnaire system.

As illustrated in FIG. 1, the questionnaire system S includes a server 1 (an example of "server apparatus") and a portable terminal 2 (an example of "terminal device"). In the example of FIG. 1, for the sake of explanation, one portable terminal 2 is illustrated, but in reality, many portable terminals 2 can communicate with the server 1.

The server 1 and the portable terminal 2 are configured to be able to send and receive data with each other using a TCP/IP and the like for, for example, communication protocol, via a network NW. The network NW is constituted by, for example, the Internet, private communication network (for example, CATV (Community Antenna Television) network), mobile communication network (a base station and the like), a gateway, and the like.

In the questionnaire system S, the server 1 collects responses of questionnaires from viewers who are watching a movie in a movie theater and the like in real time, and identifies a scene which the viewer thinks is interesting (scene in which the viewer is interested) and a scene which the viewer thinks is not interesting (scene in which the viewer is not interested). More specifically, application software for movie questionnaire response (hereinafter referred to as "movie questionnaire application") is installed in advance to the portable terminal 2 carried by the viewer, and ambient sound data collected by the portable terminal 2 is transmitted to the server 1 on the basis of predetermined operation performed with the portable terminal 2 when the viewer finds a scene which the viewer thinks "interesting" or "not interesting" while watching the movie. On the basis of the received sound data, the server 1 identifies which scene is considered to be "interesting" or "not interesting" by the viewer.

In accordance with viewer's multiple types of operations with the portable terminal 2 (operation corresponding to "interesting" and operation corresponding to "not interesting"), the movie questionnaire application transmits the sound data as well as impression identification information indicating which type of operation is performed. In response, on the basis of the received impression identification information, the server 1 identifies whether the viewer thinks that the scene identified based on the sound data is "interesting" or "not interesting".

It should be noted that the portable terminal 2 may transmit only the sound data in accordance with a single operation performed by the viewer with the portable terminal 2 (operation corresponding to "interesting" or operation corresponding to "not interesting"). In this case, the server 1 identifies whether the viewer thinks that the scene identified based on the received sound data is "interesting" or "not interesting", in accordance with the questionnaire method defined in advance. More specifically, in this questionnaire method, the viewer is instructed to operate the portable terminal 2 only in the scene which the viewer thinks is "interesting", or the viewer is instructed to operate the portable terminal 2 only in the scene which the viewer thinks is "not interesting". Accordingly, the types of the questionnaires are limited, but the impression identification information explained above is not required.

When the movie questionnaire application is downloaded to the portable terminal 2, the owner of the portable terminal 2 is prompted to do member registration at the download site, so that the server 1 can determine which member (viewer) submits a respond to the questionnaire. When a member submits a response to the questionnaire, awarding incentive is given to the member. Alternatively, the member registration may be done with the movie questionnaire application after the movie questionnaire application is downloaded.

[2. Configuration of Server 1]

Subsequently, the configuration of the server 1 will be explained FIG. 2 to FIG. 8.

Figure 2:
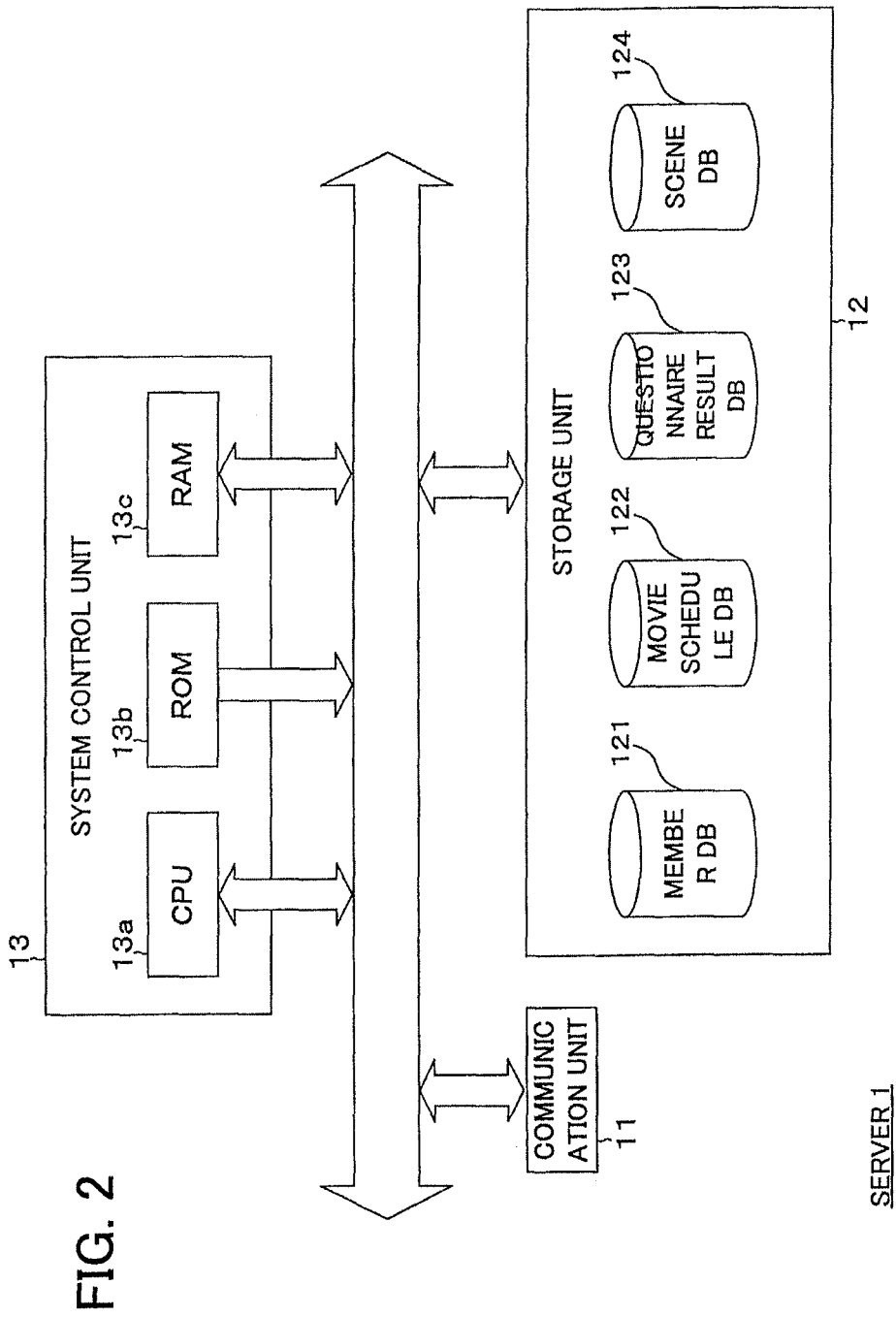
FIG. 2 is a block diagram illustrating an example of schematic configuration of a server.

As illustrated in FIG. 2, roughly speaking, the server 1 includes a communication unit 11, a storage unit 12, and a system control unit 13.

The communication unit 11 is connected to a network NW, and is configured to control communication with the portable terminal 2.

The storage unit 12 is constituted by, for example, a hard disk drive and the like, and stores various kinds of programs such as server software and operating system. Various kinds of programs may be obtained from, for example, another server apparatus and the like via the network NW, or may be recorded to a recording medium and may be read via a drive device. More specifically, various kinds of programs stored in the storage unit 12 (including a program for executing processing at the side of the server 1 in questionnaire processing explained later) may be transmitted via the network NW, and may be given by being recorded to a computer-readable recording medium.

A member database (DB (Database)) 121, a movie schedule DB 122, a questionnaire result DB 123, and a scene DB 124 are structured in the storage unit 12.

The member DB 121 as illustrated in FIG. 3 registers member information such as a member ID, password, sex, age, and mail address of a member registered as a member (viewer of movie (person who evaluates the movie)).

The movie schedule DB 122 as illustrated in FIG. 4 registers a movie ID, a location of screening of movie, a movie screening start time, a movie screening end time, and the like of the movie which is the target object of the questionnaire. An address of facilities where the movie is shown and latitude and longitude are registered as the location of screening of movie. When there are multiple screens in the same facilities or at the same latitude and the same longitude, the types of the screens are also registered.

The questionnaire result DB 123 as illustrated in FIG. 5 registers, e.g., the member ID of the member who submits a response to questionnaire, the movie ID of the movie which is the target object of the questionnaire, the scene ID of the scene for which the member submits a response to the questionnaires (scene which the viewer thinks is "interesting" or "not interesting"), and the contents of response (impression as to whether the viewer thinks "interesting" or "not interesting"). Accordingly, it is possible to identify which member thinks which scene of which movie is "interesting" or "not interesting".

The scene DB 124 as illustrated in FIG. 6 registers a scene start time and a scene end time in accordance with the movie ID and the scene ID of the movie which is the target object of the questionnaire. More specifically, as illustrated in FIG. 7, a single movie is divided into multiple scenes in accordance with the contents and the like, whereby the start time and the end time of each scene are determined, and therefore, a scene ID is assigned to each scene, and as illustrated in FIG. 8, the start time and the end time of each scene is registered to the scene DB 124 in association with the movie ID and the assigned scene ID of the movie. Accordingly, by looking up the scene DB 124, the scene ID corresponding to the scene at that moment can be identified based on the elapsed time from the movie screening start time. When the location of screening of the movie and the movie screening time can be identified, the movie schedule DB 122 may also be looked up, and the elapsed time from the movie screening start time may be calculated on the basis of the current time, and the corresponding scene may be identified. The storage unit 12 is an example of "storage means" and "response storage means" of the present invention.

In the storage unit 12, the sound/video data of the movie which is the target object of the questionnaire are stored in association with the movie ID. The system control unit 13 compares the sound/video data and the sound data transmitted from the portable terminal 2, and obtains a time corresponding to a portion where the sound matches, and determines which of the scenes the obtained time corresponds to, thus identifying a scene of the movie.

The system control unit 13 includes a CPU (Central Processing Unit) 13a, a ROM (Read Only Memory) 13b, a RAM (Random Access Memory) 13c, and the like, and functions as a computer. Then, the CPU 13a achieves various kinds of functions by reading and executing various kinds of programs stored in the ROM 13b and the storage unit 12. The system control unit 13 is an example of "receiving means", "identifying means", and "type information transmission means" of the present invention.

The server 1 may be constituted by multiple server apparatuses such as a server for managing various kinds of databases, a scene identifying processing server for performing processing for identifying a scene of a movie, and a WWW server for providing various kinds of information.

[3. Configuration of Portable Terminal 2]

Although not shown in the figure, the portable terminal 2 includes, for example, a system control unit having a CPU, RAM, ROM, a storage unit, a communication unit for communicating with the server 1 and the like, an operation unit operated by the owner, a display unit for displaying a Web page, an operation screen, and the like, an acceleration sensor, and a sound collecting unit. Examples of the portable terminals 2 include a computer, a smartphone, a PDA (Personal Digital Assistant), a cellular phone, and the like used by the user.

The acceleration sensor measures acceleration in at least the horizontal direction and the vertical direction. On the basis of the acceleration measured by the acceleration sensor and the direction thereof, the system control unit of the portable terminal 2 can determine whether the portable terminal 2 is moved (shaken) in the horizontal direction or moved (shaken) in the vertical direction. In the movie questionnaire application, operation for moving the portable terminal 2 in the horizontal direction (shaking the portable terminal 2 in the horizontal direction) corresponds to "interesting", and on the other hand, operation for moving the portable terminal 2 in the vertical direction (shaking the portable terminal 2 in the vertical direction) corresponds to "not interesting". For example, operation corresponding to "interesting" that is performed by the viewer at an interesting scene or operation corresponding to "not interesting" that is performed by the viewer at a not interesting scene while the movie questionnaire application is activated is called questionnaire response operations. The operation for moving the portable terminal 2 in the horizontal or vertical direction is an example of questionnaire response operation. A three-axis acceleration sensor can be used as an acceleration sensor.

The sound collecting unit collects ambient sound of the portable terminal 2. In particular, in the present embodiment, when questionnaire response operation (for example, detection with the acceleration sensor) is performed, the sound of the movie on the screen is collected for a certain period of time. The collected sound is converted into the sound data by the system control unit of the portable terminal 2, and is transmitted to the server 1.

[4. Operation During Questionnaire Processing in the Questionnaire System S]

Figure 9:
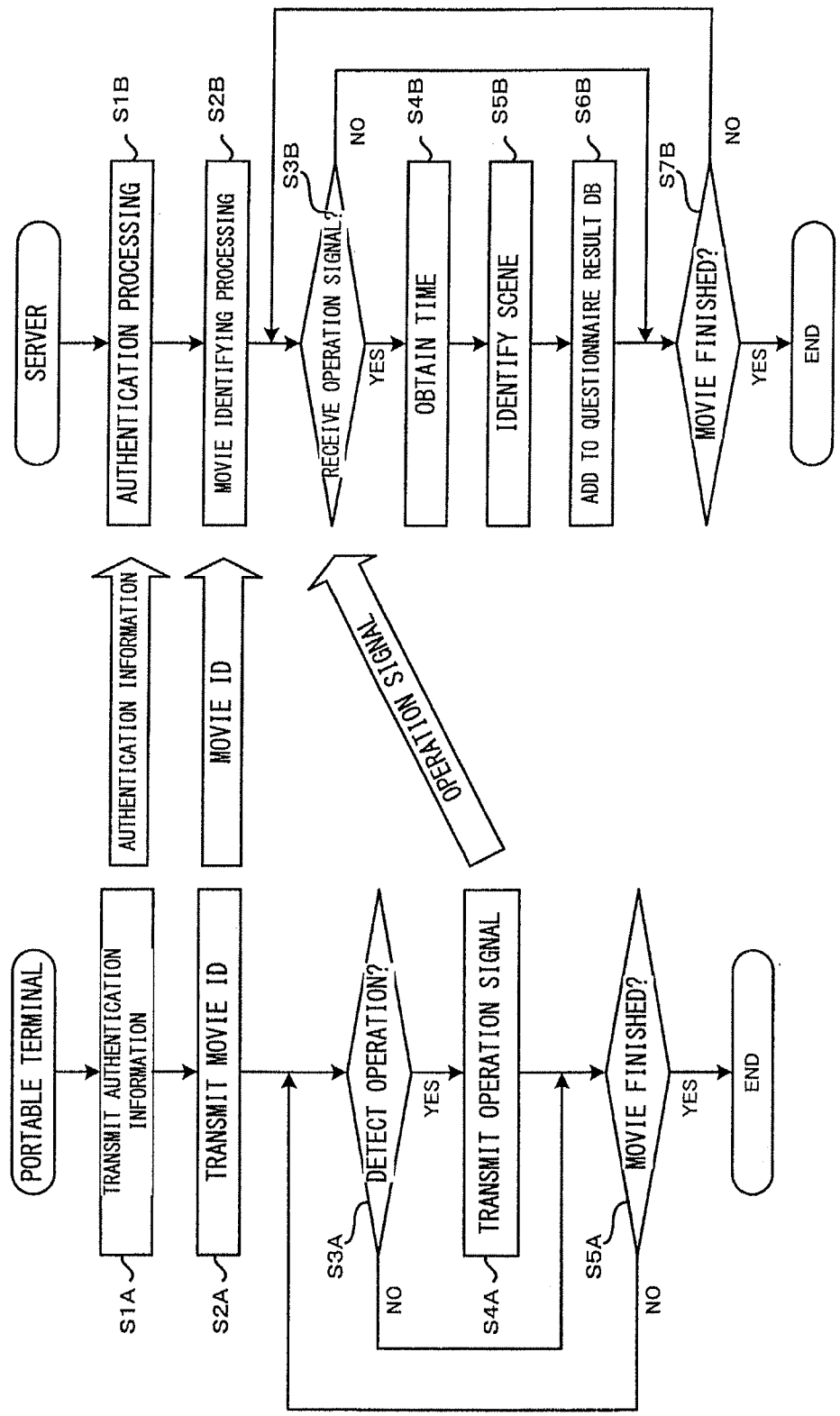
FIG. 9 is a flowchart illustrating an example of operation during questionnaire processing of the questionnaire system.

Subsequently, operation of the server 1 and the portable terminal 2 during questionnaire processing will be explained with reference to the flowchart as illustrated in FIG. 9. The questionnaire processing as illustrated in FIG. 9 is executed after the viewer who watches the movie activates the movie questionnaire application of the portable terminal 2 before the movie starts.

First, the system control unit of the portable terminal 2 prompts the viewer who watches the movie to input authentication information (member ID and password), and transmits the inputted authentication information to the server 1 (step S1A). In response, the system control unit 13 of the server 1 performs authentication processing on the basis of the member ID and the password registered to the member DB 121 and the received authentication information (step S1B).

Subsequently, the system control unit of the portable terminal 2 receives viewer's terminal operation, and transmits, to the server 1, the movie ID of the movie which the viewer watches (movie which is the target object of the questionnaire) and information about the location of screening of movie which indicates the location where the movie is shown (step S2A). At this occasion, the system control unit of the portable terminal 2 receives, in advance, the list of movies which are the target objects of questionnaires from the server 1 when the application is activated, and shows the list to the viewer and lets the viewer to select a movie which the viewer is going to watch. When the viewer already knows the movie ID or title of the movie which is the target object of the questionnaire, the movie ID that is identified from the movie ID or title which is input by the viewer may be transmitted. In response, on the basis of the received movie ID and the information about the location of screening of the movie, the system control unit 13 of the server 1 identifies the movie and location of screening of the movie which is watched by the member authenticated in the processing of step S1B (step S2B). This processing up to this point is preferably done before the viewer starts watching the movie.

Subsequently, the system control unit of the portable terminal 2 monitors questionnaire response operation in which the viewer moves the portable terminal 2 in the horizontal direction (corresponding to "interesting") or in the vertical direction (corresponding to "not interesting") until the movie is finished (step S3A: NO, step S5A: NO). Then, when the questionnaire response operation is detected (step S3A: YES), the system control unit of the portable terminal 2 causes the sound collecting unit to collect ambient sound (in particular, sound of the movie) for a certain period of time, converts the collected sound into sound data, and transmits the sound data to the server 1 (step S4A). At this occasion, for example, in accordance with which of the horizontal direction and the vertical direction the portable terminal 2 is moved in the questionnaire response operation, the system control unit of the portable terminal 2 transmits the sound data as well as the impression identification information corresponding to "interesting" or "not interesting". Further, when the sound data are transmitted, the system control unit of the portable terminal 2 also transmits transmission source information (for example, member ID, terminal identification information) so that the server 1 can distinguish the sound data from sound data transmitted from other portable terminals 2.

When the system control unit of the portable terminal 2 determines that the movie is finished (step SSA: YES), the processing is finished in the flowchart. A determination is made as to whether the movie is finished or not may be made by obtaining the movie screening end time of the movie from the server 1 in advance, or may be made on the basis of termination operation that is done when the movie is terminated by the viewer.

On the other hand, after the processing of step S2B, the system control unit 13 of the server 1 waits reception of the sound data from the portable terminal 2 until the movie is finished (step S3B: NO, step S6B: NO). When the system control unit 13 receives the sound data (step S3B: YES), the sound/video data of the movie identified in the processing of step S2B and the received sound data are compared with regard to the sound, and the scene ID of the scene of the movie corresponding to the portion where the sound matches is identified (step S4B). More specifically, the system control unit 13 obtains the time of the portion where the sound matches (time indicating the elapsed time since the start of the movie), and subsequently, looks up the scene DB 124, and determines the scene start time and the scene end time of the scene ID which includes the obtained time, thus identifying the scene ID. When the processing of step S4B is performed, the system control unit 13 compares the sound from the portion where the sound matches in the processing of the previous step S4B except that it is the processing of step S4B for the first time. Accordingly, as compared with the case where sound is compared from the head of the sound/video data, the processing load can be reduced. The system control unit 13 identifies, on the basis of the sound data as well as the received impression identification information, what kind of impression the viewer had with regard to the scene corresponding to the scene ID identified.

Subsequently, the system control unit 13 adds, to the questionnaire result DB 123, data that are made by associating the member ID authenticated in the processing of step S1B, the movie ID of the movie identified in the processing of step S2B, the scene ID of the scene of the movie identified in the processing of step S4B, and the impression of the viewer identified on the basis of the received impression identification information (the contents of responses of questionnaires) (step S5B). When the system control unit 13 determines that the movie is finished (step S6B: YES), the processing in the flowchart is terminated.

As described above, the server 1 according to the present embodiment is configured such that the storage unit 12 (an example of "storage means" of the present invention) stores the sound/video data (an example of "sound data" of the present invention) of the movie (an example of "target object" of the present invention) in advance, and the system control unit 13 (an example of "receiving means", "identifying means" of the present invention) receives ambient sound data of the portable terminal 2 collected when the questionnaire response operation is performed, from the portable terminal 2 (an example of "terminal device" of the present invention) that made the questionnaire response operation in order to submit a response to the questionnaire while the viewer (an example of "respondent" of the present invention) is watching the movie, and compares the received sound data and the sound/video data of the movie stored in the storage unit 12, and identifies the scene which is the target of the response of the questionnaire on the basis of the comparison result.

Therefore, according to the questionnaire system. S, when the viewer submits a response to the questionnaire with regard to the scene constituting the movie which the viewer is watching, the viewer may perform the questionnaire response operation with the portable terminal 2 while the viewer is watching the scene, and therefore, the response is easy. Therefore, not only scenes impressive to the viewer but also scenes vaguely remembered as good scenes can be collected as the responses of questionnaires. In addition, the server 1 can identify a scene where the viewer submits a response to the questionnaire, from the time obtained based on the sound data collected when the questionnaire response operation is performed, and therefore, the response of the questionnaire with regard to the scene can be accurately collected without mixing with responses with regard to other scenes. Further, the processing of step S4B and step S5B of FIG. 9 is executed when the sound data are received, and therefore, the responses of questionnaires can be collected in real time.

Time information is not required to identify the scene for which the viewer submits a response to the questionnaire, and therefore, even when, e.g., the movie schedule is changed due to delay or moving forward, it is possible to reliably identify the scene at which the viewer submits a response to the questionnaire.

Figure 10:
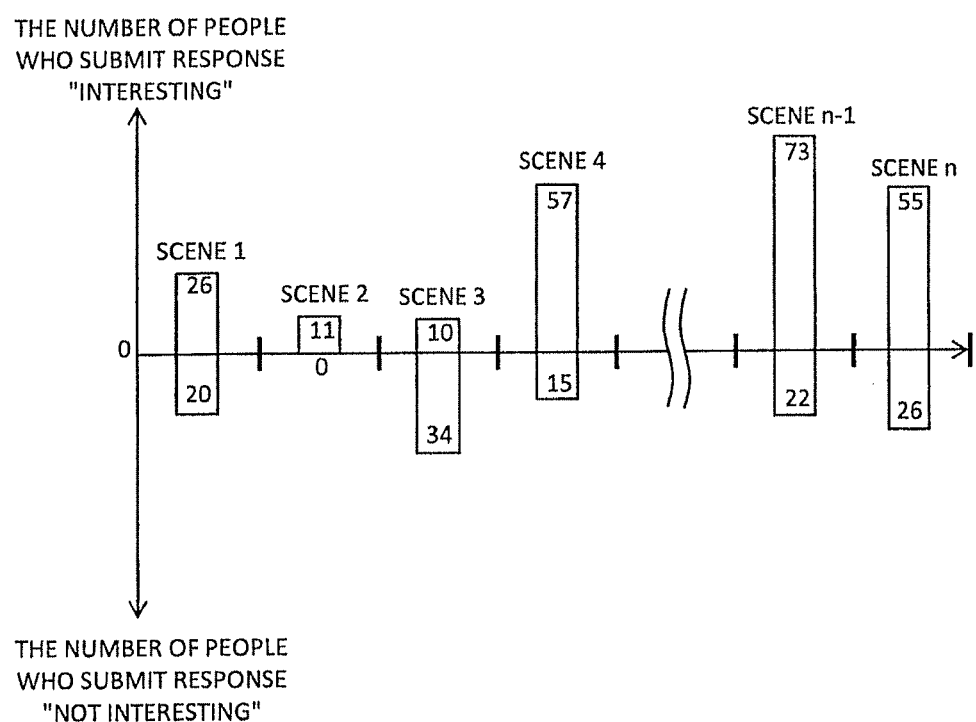
FIG. 10 is a figure illustrating an example of a questionnaire result showing, as bar graphs, the number of people responded that a scene is interesting and the number of people responded that a scene is not interesting.

In the present embodiment, the system control unit 13 of the server 1 receives impression identification information (an example of "response information" of the present invention) for identifying the content of the response to the questionnaire (i.e., "interesting" or "not interesting"), and the questionnaire result DB 123 of the storage unit 12 stores the contents of the response indicating "interesting" or "not interesting" identified based on the received impression identification information, in association with the scene identified based on the sound data. Accordingly, the contents of the responses of questionnaires for the scenes which are the target objects of the responses of questionnaires can be collected. As illustrated in FIG. 10, on the basis of the data registered to the questionnaire result DB 123, the number of registered contents of responses indicating "interesting" or "not interesting" is calculated for each scene ID, and therefore, the scenes for which many responses of "interesting" are given or the scenes for which many responses of "not interesting" are given can be identified.

In the present embodiment, in accordance with each of the contents of responses of questionnaires indicating "interesting" or "not interesting", questionnaire response operation for shaking the portable terminal 2 in the horizontal direction or the vertical direction is defined, and the impression identification information is information for identifying the contents of responses of questionnaires in accordance with the questionnaire response operation. Therefore, with regard to the scene which is the target of the response of the questionnaire, the contents of the response of multiple contents which are different and are either "interesting" or "not interesting" can be obtained in a distinguished manner, and the contents of the survey of the questionnaire can be enriched.

When multiple movies are the target objects of the questionnaires, the system control unit 13 of the server 1 (an example of "type information transmission means" of the present invention) transmits a movie list indicating the types of the movies (an example of "type information" of the present invention) to the portable terminal 2. The storage unit 12 also stores sound/video data for each type of the movies, and the system control unit 13 receives, from the portable terminal 2, the movie ID indicating the type of movie selected by the viewer on the basis of the movie list transmitted in advance (an example of "selected type information" of the present invention), and identifies the scene of the movie on the basis of the sound/video data corresponding to the received movie ID and the received sound data. Therefore, even when there are multiple movies evaluated by the viewer (which are the target objects of the questionnaires), it is possible to appropriately find the movie for which the viewer submits a response to the questionnaire.

According to the questionnaire system S of the present embodiment, the viewer can do questionnaire response operation as many times as the viewer wants while watching the movie, and therefore, the viewer can identify many scenes which the viewer thinks are "interesting" or "not interesting".

The questionnaire system S is effective when it is employed for questionnaires conducted at a preview of movie and the like. For example, two movies, each has different content of ending, is showed at a preview, and an ending of good reputation in the questionnaire result, i.e., an ending having evaluation "interesting" for the scene corresponding to the ending, may be adopted as an ending for official release.

The questionnaire system S is not limited to be applied to the movies shown in facilities such as movie theaters. For example, the questionnaire system S can also be applied to movies and dramas shown on television broadcast. In this case, survey by questionnaire can be conducted without installing dedicated devices for submitting a response to a questionnaire at each household.

[5. Modification]

[5.1. Anti-Fraud Measure 1]

The storage unit 12 of the server 1 may store evaluation position information indicating the location of screening of a movie where the movie is shown for each movie ("position where the target object is to be viewed" of the present invention) in association with the movie, and the system control unit 13 (an example of "position anti-fraud determination means" of the present invention) may receive terminal position information indicating the position of the portable terminal 2 from the portable terminal 2 and response target object information indicating the movie for which a response of a questionnaire is submitted, and when the evaluation position information stored in the storage unit 12 in association with the movie for which the response of questionnaire is submitted which is indicated by the received response target object information is different from the received terminal position information, the response of questionnaire based on the sound data transmitted from the portable terminal 2 may be determined to be invalid. In this configuration, when the response to the questionnaire is submitted at a position different from the position where the movie is shown even though the viewer does not actually view the movie, such response may be determined to be invalid.

[5.2. Confirmation of Scene by Viewer]

The system control unit 13 of the server 1 (an example of "transmission means" of the present invention) transmits sound/video data corresponding to the scene of the movie identified in processing of step S4B (an example of "information indicating the scene of the target object" of the present invention) to the portable terminal 2, and the viewer who receives the sound/video data with the portable terminal 2 determines whether the scene is a scene which is the target of the response of questionnaire, and the confirmation information indicating the determination result is transmitted from the portable terminal 2. When the received confirmation information indicates that the scene is not a scene which is the target of the response of the questionnaire, the system control unit 13 may be configured to cancel the fact that the system control unit 13 identified the scene of the movie in the processing of step S4B. In this configuration, the viewer can confirm whether the scene of the movie for which the viewer actually submits a response of the questionnaire is the same as the scene of the movie identified by the server 1, and the accuracy in identifying the scene of the movie can be improved. As the "information indicating the scene of the target object" of the present invention, the sound data corresponding to the scene of the movie identified in the processing of step S4B may be transmitted, and the viewer may listen to the transmitted sound data, and the viewer may determine whether the scene is the same as the scene for which the viewer submits the response of the questionnaire. In this case, the viewer can confirm the identified scene even with the portable terminal 2 not having the display unit. Sound data which are less than the sound/video data are transmitted, so that the cost of transmission can be suppressed.

[5.3. Application to a Site Other than Movie Theater]

In addition, the questionnaire system S can also be applied to a case where a viewer watches movies or other contents recorded in recording media such as DVDs at home.

[5.4. Variation of Questionnaire Response Operation]

In the present embodiment, for example, two types of operations for moving the portable terminal 2 in the horizontal/vertical direction are shown as the questionnaire response operation, but these operations may be made into four types of operations by distinguishing operations with the surface of the portable terminal 2 being the upper side and operations with the surface of the portable terminal 2 being the lower side. In this case, in addition to "interesting scene" and "not interesting scene", for example, pitiful scene and scary scene may be added as the scenes for which responses of questionnaires are submitted, and various responses can be collected. Instead of the operation for moving the portable terminal 2 in the horizontal/vertical direction, the contents of responses of questionnaires (for example, interesting, not interesting, pitiful, scary, and the like) may be displayed on the display unit in such a manner that they can be selected with a cursor, and the viewer may be allowed to select any one of them. Further, the contents of responses of questionnaires and the buttons of the operation unit may be associated with each other in advance, and the viewer may be allowed to press any one of them.

[5.5. Postponing Processing for Registering Responses of Questionnaires]

In the present embodiment, sound/video data of the movie are stored in advance to the storage unit 12 of the server 1 before the movie is shown, and the system control unit 13 of the server 1 is configured to perform processing of step S5B and processing of step S4B on the basis of the sound data transmitted from the viewer's portable terminal 2 while the movie is shown, and instead of this, the processing of step S4B and the processing of step S5B may be configured to be done after the screening of the movie is finished. However, in the system control unit 13 of the server 1, the storage unit 12 stores the sound data, the impression identification information, and the transmission source information received while the movie is shown. According to this configuration, even when the sound/video data of the movie cannot be stored to the storage unit 12 or even when the scene ID, the scene start time, and the scene end time cannot be registered to the scene DB 124 before the movie is shown, the sound/video data are stored to the storage unit 12, and after the scene ID, the scene start time, and the scene end time are registered to the scene DB 124, processing corresponding to the processing of step S4B and the processing of step S5B is performed, i.e., the contents of the response with regard to the scene and the scene of the movie are identified, on the basis of the sound data and the impression identification information stored in the storage unit 12 while the movie is shown, and processing for adding data to the questionnaire result DB 123 can be done at any time. This configuration is effective when the responses of questionnaires are collected with regard to the viewing target object for which sound/video data cannot be prepared in advance such as theatrical performance and concerts where live performance is held. For example, when the target of the questionnaire is a scene of a concert, the system control unit 13 of the server 1 receives the sound data, the impression identification information, and the transmission source information from the portable terminal 2 of the viewer and stores them to the storage unit 12 during the concert, and on the other hand, a recording device different from the server 1 records the scene of the concert at the concert hall. Then, after the concert is finished, the system control unit 13 of the server 1 may perform processing to identify the scene of the concert and the contents of the responses for the scene, on the basis of the sound/video data recorded by the recording device and the data of the scene DB 124 registered based on this, and the sound data and the impression identification information stored in the storage unit 12 during the concert, and add them to the questionnaire result DB 123.

[5.6. Usage of Sound Data Instead of Sound/Video Data]

In the present embodiment, the sound/video data of the viewing target object such as the movie are stored to the storage unit 12 of the server 1, but since it is sufficient to make comparison with the sound data received from the portable terminal 2, the sound data of the viewing target object may be stored instead of the sound/video data.

[5.7. Anti-Fraud Measure 2]

A signal transmitter for transmitting a signal that can be received by the portable terminal 2 (for example, a radio transmitter employing Bluetooth (registered trademark) as communication standard) may be installed in a movie theater, and a response to the questionnaire may be submitted from the portable terminal 2 receiving the signal, so that a person who does not actually watch the movie cannot submit a response to the questionnaire.

[5.8. Distinguishing the Contents of Responses of Questionnaires by the Server]

In the above embodiment, the portable terminal 2 is configured to convert the signal which is output from the acceleration sensor into the impression identification information indicating "interesting" or "not interesting" and transmit the impression identification information as well as the sound data to the server 1, but the embodiment is not limited thereto. For example, the portable terminal 2 may transmit the signal which is output from the acceleration sensor (signal indicating the acceleration in the vertical direction or horizontal direction) to the server 1 as it is, and the server 1 may convert the signal indicating the acceleration to impression identification information indicating, e.g., "interesting" or "not interesting".

[5.9. Obtaining Impression Level]

In the above embodiment, in accordance with whether the viewer shakes the portable terminal 2 in the horizontal direction (corresponding to "interesting") or the vertical direction (corresponding to "not interesting"), whether the viewer thinks that the scene is interesting or not interesting is collected as the response of questionnaire, but on the basis of the number of times the viewer shakes the portable terminal 2 and the acceleration when the viewer shakes the portable terminal 2, the degree (level) as to how much the viewer thinks that the scene is interesting or not interesting may be further collected. This is based on such idea that, in the scene which the viewer thinks is very interesting, the viewer is likely to shake the portable terminal 2 faster or shake the portable terminal 2 for a larger number of times than the scene which the viewer thinks is somewhat interesting. Accordingly, like a questionnaire using a conventional questionnaire sheet, the questionnaire system S can realize evaluation in five levels as to how much each scene is interesting or not interesting. It should be noted that in this case, the viewer is preferably notified in advance that the viewer is expected to shake the portable terminal 2 faster or shake the portable terminal 2 for a larger number of times in accordance with the degree as to how much the scene is interesting or not interesting.

More specifically, in step S3A of FIG. 9, when questionnaire response operation is detected, the control unit of the portable terminal 2 obtains operation value information, which indicates the number times the terminal device 2 is shaken and the acceleration when the terminal device is shaken. It should be noted that, as the acceleration included in the operation value information, the control unit of the portable terminal 2 may obtain the maximum acceleration when questionnaire response operation is performed, or may obtain the average acceleration when questionnaire response operation is performed. Then, in step S4A of FIG. 9, the control unit of the portable terminal 2 transmits the operation value information and the impression identification information as well as the sound data to the server 1.

On the other hand, when the system control unit 13 of the server 1 (an example of "level identifying means" of the present invention) receives the sound data (step S3B: YES), the system control unit 13 of the server 1 obtains the degree of strength of the impression of the viewer indicated by the impression identification information (impression of "interesting" or "not interesting") (hereinafter referred to as "impression level") on the basis of the sound data as well as the received operation value information. When the system control unit 13 obtains the impression level, this is registered to the questionnaire result DB 123 in association with the viewer's impression. The questionnaire result DB 123 according to the modification registers the member ID, the movie ID, the scene ID of the scene which is the target of response of questionnaire, the content of the response ("interesting" or "not interesting"), and in addition, the questionnaire result DB 123 according to the modification registers the impression level in association therewith. Accordingly, by looking up the questionnaire result DB 123, it is possible to identify which member thinks which scene of which movie is interesting or not interesting at which impression level. In this case, the storage unit 12 in which the questionnaire result DB 123 is structured is an example of "level storage means" of the present invention.

A method with which the system control unit 13 obtains the impression level includes, for example, a method for generating an impression level obtaining table as illustrated in FIG. 11 in advance and obtaining impression level "1" to "5" on the basis of the number of times the portable terminal 2 is shaken and the acceleration included in the operation value information. The impression level obtaining table as illustrated in FIG. 11 is defined such that the larger the acceleration is or the larger the number of times the portable terminal 2 is shaken, the higher the obtained impression level is. The higher the value of the impression level is, the higher the strength of the impression is. The system control unit 13 may use not only the number times the terminal device 2 is shaken and the acceleration when the questionnaire response operation is performed but also the moving distance of the portable terminal 2 (i.e., amplitude of shaking), and may obtain the impression level from these three elements. Alternatively, the system control unit 13 may obtain the impression level on the basis of at least one of these three elements. Alternatively, the system control unit 13 may obtain the impression level on the basis of other methods. As described above, the system control unit 13 registers the impression level to the questionnaire result DB 123, and later calculates the number of items registered for each impression level for each of the contents of responses, i.e., either "interesting" or "not interesting, for each of the scene IDs, so that, as illustrated in FIG. 12, the system control unit 13 can identify, e.g., the number of viewers who submits response "interesting" and thinks the scene is interesting with the impression level "5" and the number of viewers who thinks the scene is not interesting with the impression level "1".

For example, the system control unit 13 may make the number of times the portable terminal 2 is shaken and the acceleration of the portable terminal 2 into dimensionless or without modifying it at all, and may add the values or obtain the total thereof, and subsequently, compare the addition value or the total value with each border value separating each of the impression levels of "1" to "5", defined for comparison with the addition value or the total value in advance, and may obtain the impression level in accordance with between which of border values the addition value or the total value are included.

By the way, when impression levels of multiple viewers are calculated, e.g., when it is an object to identify a scene which the highest number of viewers think are interesting with the impression level "5" or when it is an object to identify a scene which the highest number of viewers think are not interesting with the impression level "3" or more, the system control unit 13 preferably corrects any one of the number of times the portable terminal 2 and the acceleration of the portable terminal 2 in view of the individual difference occurring when each viewer shakes the portable terminal 2 during the questionnaire response operation when each impression level is obtained. This is based on such idea that, even in the scene which is considered to be interesting with the same degree by each viewer, the number of times the portable terminal 2 is shaken and the acceleration of the portable terminal 2 should be different for each viewer. For example, when there are a viewer A and a viewer B who perform questionnaire response operation with regard to multiple scenes, and the average acceleration calculated from the acceleration during the questionnaire response operation of the viewer A is "0.5 m/s$^2$", and the average acceleration calculated from the acceleration during the questionnaire response operation of the viewer B is "0.8 m/s$^2$", then, it is considered that the viewer B tends to shake the portable terminal 2 with a higher level of acceleration even for the scene which is considered to be interesting with the same degree. Accordingly, in view of the individual difference during the questionnaire response operation, the system control unit 13 obtains the impression level upon correcting the data of the number of times the portable terminal 2 is shaken and the acceleration of the portable terminal 2, so as to obtain the same impression level for the scene which the viewer thinks is interesting or not interesting with the same degree. It is to be understood that when a scene which is most interesting to a particular viewer (scene with impression level "5") is to be identified, such correction is unnecessary.

Publicly known methods can be employed as the method of correction, and for example, methods using an average value, distribution, standard deviation, a median value, value, and a mode value can be employed. For example, in view of the distribution, the acceleration of the viewer A can be corrected (normalized) in accordance with the following expression.

$$Z=(X-\mu)/\sigma$$

μ: arithmetical mean of acceleration during questionnaire response operation of viewer A σ: standard deviation calculated from acceleration during questionnaire response operation of viewer A X: acceleration to be normalized Z: normalized acceleration Further, now, a case for correcting the acceleration will be explained as an example of method of correction. First, as a premise, the system control unit 13 saves all the operation value information received from the terminal device 2 of each viewer to the storage unit 12 and the like. Then, the system control unit 13 (an example of "average calculation means" of the present invention) looks up all the operation value information saved in the past with a regular interval, and calculates the average acceleration of the entire viewers and calculates the average acceleration of each viewer. The system control unit 13 calculates a ratio ("correction ratio") of the average acceleration of the entire viewers on the basis of the average acceleration of each viewer. Then, the system control unit 13 (an example of "correction means" of the present invention) actually receives operation value information from the portable terminal 2 of a viewer C, and when the impression level is obtained, the system control unit 13 multiplies the acceleration included in the received operation value information by the ratio calculated for the viewer C, thus correcting the acceleration. For example, when system control unit 13 calculates the average acceleration of the entire viewers as "0.5 m/s$^2$" and the average acceleration of the viewer C as "0.8 m/s$^2$" from the operation value information in the past, the system control unit 13 calculates a correction ratio "5/8" for the viewer C. Then, when the system control unit 13 receives the operation value information from the portable terminal 2 of the viewer C, the acceleration included in the received operation value information is multiplied by the correction ratio "5/8", and thus, the acceleration is corrected. As described above, the system control unit 13 corrects the acceleration which serves as the basis for obtaining the impression level of each viewer, on the basis of the ratio of the average acceleration of the entire viewers and the average acceleration of each individual. It should be noted that the system control unit 13 also corrects the number of times the portable terminal 2 is shaken, just like the acceleration.

For each scene, instead of obtaining both of responses, i.e., "interesting" and "not interesting", it may be possible to let each viewer simply evaluate each scene in five levels, and the evaluation level (an example of "level of evaluation for the respondent with regard to the scene") may be stored to the storage unit 12. Accordingly, for example, the viewer's evaluation value in five levels for each scene can be obtained, and, for example, the average evaluation value of each scene can be obtained. In this case, the questionnaire response operation may be simply shaking the portable terminal 2, and the control unit of the portable terminal 2 transmits, to the server 1, operation value information for identifying the number of times the portable terminal 2 is shaken and the acceleration of the portable terminal 2 during the questionnaire response operation. The system control unit 13 of the server 1 (an example of "level identifying means" of the present invention) identifies the number of times the portable terminal 2 is shaken and the acceleration of the portable terminal 2 from the received operation value information, corrects them as described above, obtains the impression level "1" to "5" as the evaluation value of the five-level evaluation, and stores the impression level in association with the scene to the storage unit 12 (an example of "level storage means" of the present invention). In this case, the evaluation in five levels has been explained. But the levels may also be divided into three or seven levels. However, the impression level obtaining table is required to be corrected as necessary. Alternatively, multiple items (for example, "the degree of action", "the degree of pitifulness", "the degree of fear", "the degree of funniness", and the like) may be evaluated in five levels. In this case, the questionnaire response operation needs to be assigned to each item, and it is necessary to determine for which item the viewer's questionnaire response operation is made.

Since each scene which belongs to the latter half of the movie is considered to cause the person who evaluates the movie to make less reaction than each scene which belongs to the first half, the system control unit 13 performs as follows. When the questionnaire response operation is performed, the system control unit 13 may multiply at least one of the number of times the portable terminal 2 is shaken and the acceleration of the portable terminal 2 by a predetermined coefficient obtained from experience based on the tendency, thus correcting it so that the numerical value increases.

[5.10. Exclusion of Abnormal Response]

In order to improve the accuracy of the questionnaire result, the system control unit 13 may exclude, for example, responses made by questionnaire respondents who make abnormally too many or less questionnaire response operations when the questionnaire result is calculated.

[5.11. Comparison Using Sound Outside of Audible Range]

Sound outside of the range that can be heard by a person may be mixed with the sound of a movie and may be output in a mixed manner, and the storage unit 12 of the server 1 may store the sound outside of the audible range as sound data, and in the processing of step 4B of FIG. 9, the system control unit 13 of the server 1 may compare the sound outside of the audible range included in the sound data received from the portable terminal 2 and the sound outside of the audible range included in the sound data stored in the storage unit 12, obtain a time, and identify the scene ID.

EXPLANATION OF REFERENCE NUMERALS

1 SERVER
11 SERVER/COMMUNICATION UNIT
12 SERVER/STORAGE UNIT
13 SERVER/SYSTEM CONTROL UNIT
121 MEMBER DB
122 MOVIE SCHEDULE DB
123 QUESTIONNAIRE RESULT DB
124 SCENE DB
2 PORTABLE TERMINAL
NW NETWORK
S QUESTIONNAIRE SYSTEM

The invention claimed is:

1. A server apparatus comprising:
at least one memory configured to store program code; and
at least one processor configured to access said at least one memory, read said program code, and operate as instructed by said program code, said program code comprising:
receiving code configured to cause at least one of said at least one processor to receive, from a terminal device of a respondent, an operation signal for obtaining a time when the respondent performs response operation to submit a response to a questionnaire with regard to a target object while the respondent views the target object including multiple scenes, a scene of the target object changing over an elapsed time;
storage code configured to cause at least one of said at least one processor to store scene information in which a time and each scene of the target object are associated with each other;
identifying code configured to cause at least one of said at least one processor to obtain the time based on the operation signal received by the receiving code, and identify a scene of the target object as being a target of the response of the questionnaire, based on the scene information and the obtained time; and
transmission code configured to cause at least one of said at least one processor to transmit, to the terminal device, information indicating the scene of the target object identified by the identifying code,
wherein the receiving code causes at least one of said at least one processor to receive, from the terminal device, information indicating whether the identified scene is the scene which is the target of the response of the questionnaire, and
the identifying code causes at least one of said at least one processor to cancel identification of the scene as the target of the response of the questionnaire in response to the received information indicating that the identified scene is not the scene which is the target of the response of the questionnaire.

2. The server apparatus according to claim 1, wherein the receiving code causes at least one of said at least one processor to further receive response information for identifying a content of the response of the questionnaire, and
the program code further comprises response storage code configured to cause at least one of said at least one processor to store the content of the response of the questionnaire identified based on the response information received by the receiving code, in association with the scene identified by the identifying code.

3. The server apparatus according to claim 2, wherein a plurality of response operations are defined in accordance with each of a plurality of different contents of responses of questionnaires, and
the response information is information for identifying the content of the response of the questionnaire in accordance with the response operation.

4. The server apparatus according to claim 1, wherein the program code further comprises type information transmission code configured to cause at least one of said at least one processor to transmit type information indicating a type of each target object to the terminal device when there are a plurality of target objects,
wherein the storage code causes at least one of said at least one processor to store the scene information for each type of the target object,
the receiving code causes at least one of said at least one processor to further receive, from the terminal device, selected type information indicating the type of the target object selected by the respondent based on the transmitted type information, and
the identifying code causes at least one of said at least one processor to identify the scene of the target object, based on the scene information corresponding to the type indicated by the selected type information received and the time obtained based on the received operation signal.

5. The server apparatus according to claim 1, wherein the storage code causes at least one of said at least one processor to store evaluation position information about a position where the target object is to be viewed in association with the target object,
the receiving code causes at least one of said at least one processor to further receive response target information indicating the target object with regard to which the response to the questionnaire is submitted, and receive, from the terminal device, terminal position information indicating a position of the terminal device, and
the program code further comprises position anti-fraud determination code configured to cause at least one of said at least one processor to determine that the response of the questionnaire based on the operation signal transmitted from the terminal device is invalid, when the evaluation position information stored in association with the target object with regard to which the response of the questionnaire is submitted which is indicated by the received response target information is different from the received terminal position information.

6. The server apparatus according to claim 1, wherein the receiving code causes at least one of said at least one processor to further receive, from the terminal device, sound data collected when the respondent views the target, and
the program code further comprises sound invalidity determining code configured to cause at least one of said at least one processor to determine the operation signal from the terminal device is invalid when the received sound data correspond to none of portions of the sound data of the target stored by the storage code in advance.

7. The server apparatus according to claim 2, wherein the response operation by the respondent is operation of shaking the terminal device,
the receiving code causes at least one of said at least one processor to further receive operation value information for identifying an operation value of at least one of a number of times the terminal device is shaken or acceleration of the terminal device when the operation of shaking is completed,
the program code further comprises level identifying code configured to cause at least one of said at least one processor to identify a level of the content of the response of the questionnaire from the operation value identified based on the received operation value information, and
the response storage code causes at least one of said at least one processor to store the level identified by the level identifying code, in association with the scene identified by the identifying code.

8. The server apparatus according to claim 1, wherein the response operation by the respondent is operation of shaking the terminal device,
the receiving code causes at least one of said at least one processor to further receive operation value information for identifying an operation value of at least one of a number of times the terminal device is shaken or acceleration of the terminal device when the operation of shaking is completed, and
the program code further comprises:
level identifying code configured to cause at least one of said at least one processor to identify a level of evaluation for the respondent with regard to the scene when the response operation is performed, from the operation value identified based on the received operation value information; and
level storage code configured to cause at least one of said at least one processor to store the level of evaluation identified by the level identifying code, in association with the scene identified by the identifying code.

9. The server apparatus according to claim 7, wherein the program code further comprises:
operation value storage code configured to cause at least one of said at least one processor to store the operation value information received by the receiving code;
average calculation code configured to cause at least one of said at least one processor to look up the operation value information stored in the operation value storage code, calculate an average of operation values of entire respondents that perform operation to submit responses of questionnaires, and calculate an average of operation values of any one of the respondents that perform operation to submit the response of the questionnaire; and
correction code configured to cause at least one of said at least one processor to correct the operation value identified by the operation value information transmitted from the terminal device of the one of the respondents, based on a ratio of the average of the operation values calculated for the entire respondents and the average of the operation values calculated for the one of the respondents,
wherein the level identifying code causes at least one of said at least one processor to identify the level from the operation value corrected by the correction code.

10. A questionnaire response collection method executed by a computer included in a server apparatus,
the questionnaire response collection method comprising:
receiving, from a terminal device of a respondent, an operation signal for obtaining a time when the respondent performs response operation to submit a response to a questionnaire with regard to a target object while the respondent views the target object including multiple scenes, a scene of the target object changing over an elapsed time;
storing scene information in which a time and each scene of the target object are associated with each other;
obtaining the time based on the operation signal, and identifying a scene of the target object as being a target of the response of the questionnaire, based on the scene information and the obtained time;
transmitting, to the terminal device, information indicating the scene of the target object identified,
receiving, from the terminal device, information indicating whether the identified scene is the scene which is the target of the response of the questionnaire, and
cancelling identification of the scene as the target of the response of the questionnaire in response to the received information indicating that the identified scene is not the scene which is the target of the response of the questionnaire.

11. A non-transitory computer-readable recording medium recorded with a questionnaire response collection program for causing a computer included in a server apparatus to perform:
receiving, from a terminal device of a respondent, an operation signal for obtaining a time when the respondent performs response operation to submit a response to a questionnaire with regard to a target object while the respondent views the target object including multiple scenes, a scene of the target object changing over an elapsed time;
storing scene information in which a time and each scene of the target object are associated with each other;
obtaining the time based on the operation signal, and identifying a scene of the target object as being a target of the response of the questionnaire, based on the scene information and the obtained time;
transmitting, to the terminal device, information indicating the scene of the target object identified,
receiving, from the terminal device, information indicating whether the identified scene is the scene which is the target of the response of the questionnaire, and
cancelling identification of the scene as the target of the response of the questionnaire in response to the received information indicating that the identified scene is not the scene which is the target of the response of the questionnaire.

* * * * *